April 4, 1939. W. M. SPENCER 2,152,826
ARTICLE AND PROCESS FOR PRODUCING THE SAME
Filed Sept. 4, 1936

INVENTOR
WILLIAM M. SPENCER
BY Mock-Blum
ATTORNEYS.

Patented Apr. 4, 1939

2,152,826

UNITED STATES PATENT OFFICE 2,152,826

ARTICLE AND PROCESS FOR PRODUCING THE SAME

William M. Spencer, Allentown, Pa., assignor, by mesne assignments, to Filatex Corporation, New York, N. Y., a corporation of New Jersey Application September 4, 1936, Serial No. 99,342

15 Claims. (Cl. 57—152)

The present invention relates in general to elastic threads and, in particular, to elastic rubber filaments which are adapted to be covered with a textile material, and to correlated improvements in the process of producing such threads and in the article so produced.

The rubber filaments of round or elliptical cross-section heretofore employed in making covered elastic threads have had a substantially smooth contour and surface. In covering such filaments, difficulty was encountered due to the creeping of the textile covering with respect to the rubber filament. To overcome this creeping effect, it has been suggested to increase the tension of the covering material during the winding process so as to imbed the covering into the body of the filament. This process was found difficult to control as the rubber filaments and the covering thread frequently broke due to the increased winding tension. Further, the flexibility of the covered thread was impaired due to the tautness of the covering thread which materially compressed the body of the rubber filament. Moreover, when uncovered rubber threads which are of smooth contour are woven or knitted with textile threads, the rubber threads frequently become displaced in the fabric.

The object of the invention is to obviate the foregoing and like disadvantages characterizing the heretofore known products.

A further object of the invention is to provide a covered elastic rubber thread in which the covering is anchored sufficiently to prevent creeping and substantial displacement of the covering relative to the rubber filament.

An additional object is to provide a covered elastic rubber thread in which the body of the rubber filament is substantially not indented even though the covering is maintained in a taut condition.

Another object is to provide a rubber filament adapted to be covered in forming elastic threads which is characterized by affording anchorage for the covering or for textile threads associated therewith by knitting or weaving.

A further object of the invention is to provide a process for making covered rubber thread in which the covering is adapted to withstand substantial displacement during weaving or knitting operations.

Other objects of the invention will in part be obvious and will in part appear hereinafter.

According to the invention the product comprises a rubber filament having one or more compressible projections on its surface. The invention also includes fabrics containing such rubber filaments either covered or uncovered. More particularly the invention comprises a covered elastic thread having a core composed of a rubber filament having compressible projecting fins disposed longitudinally on its surface, and a covering of a textile or like material thereon, the projections of the filament affording sufficient tension and frictional contact between the covering and the core to prevent substantial displacement of the covering relative to the core.

The invention accordingly comprises an article of manufacture possessing the features, properties, and the relation of elements which will be exemplified in the article hereinafter described and the scope of the invention will be indicated in the claims.

For a fuller understanding of the nature and objects of the invention reference should be had to the following detailed description taken in connection with the accompanying drawing, in which:

Figs. 1 to 15 inclusive are enlarged views which illustrate in cross-section several embodiments of the rubber filament of the invention.

Figure 1:

As shown in the drawing, the rubber filament of the invention is composed essentially of two cooperating elements, a body portion 20 comprising the major part of the filament and one or more relatively small projecting fins 21 attached to the body portion.

Figure 5:
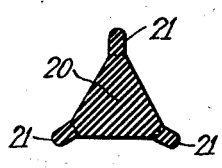
Figure 6:
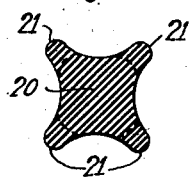
Figure 7:
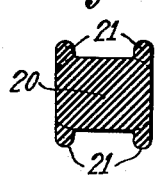
Figure 8:
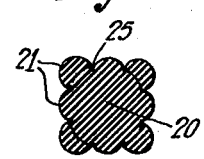

The cross-section of the body portion 20 may be generally circular, square, triangular, elliptical, etc. in shape. A few embodiments of the filaments of the invention having various shapes in cross-section above mentioned have been shown in the drawing as follows: Figs. 1-4 inclusive, illustrate a generally circular cross-section; Fig. 5, a generally triangular configuration; Figs. 6-8 inclusive, a generally square cross-section; Figs. 9-14 inclusive, a generally elliptical cross-section; and Fig. 15 a filament having an essentially rectangular body cross-section. It is within the purview of the invention to shape the body portion of the filament according to any desired configuration.

Figure 9:
Figure 10:
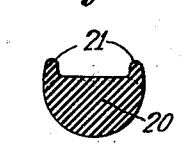
Figure 11:
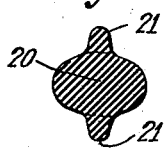
Figure 12:
Figure 18:
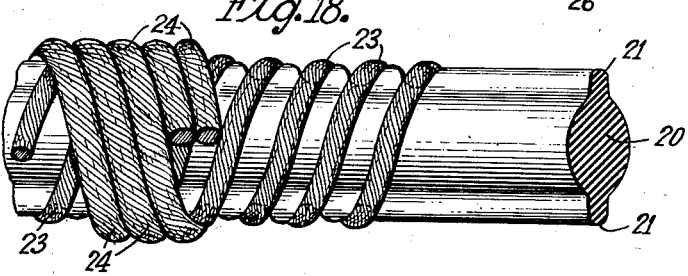
Fig. 18 shows in a magnified perspective view the filament of Fig. 1 after covering.

The body portion 20 carries on its surface one or a plurality of projecting fins 21 which are coextensive with the length of the body. Where a plurality of fins are present, they may be symmetrically or asymmetrically disposed on the body and may extend therefrom radially or tangentially. The fins may be thought of as relatively small extensions of the body or may be formed by a plurality of spaced re-entrant cusps 25 as illustrated in Figs. 8 and 9. The fins are all disposed generally longitudinally of the body portion as shown in Fig. 18. If desired, the fins may define a spiral or helical path longitudinally about the body. In general, the fins 21 have rounded cross-sectional contours and are free from rough edges whereby they resist ageing.

The size, shape, number and positioning of the fins are such that they are readily compressible and/or collapsible against the body portion under a winding pressure normally suitable for applying the covering. That is, the size and configuration of the fin is such, and the tension of winding of the covering such that the covering forms depressions where it contacts the fin at which points the fin is substantially compressed against the body of the filament. For achieving the essential objects of the invention it is preferable that the ratio of height of the fin to the mean diameter of the body of the filament lies between 1:2 and 1:5. The broken lines on the Figs. 1 to 15 inclusive indicate the approximate boundary between the fin and the body portion of the filament. For example, if the body of a filament has a mean diameter of about .007 inch, the fins may project for a distance of about .002 inch above the surface of the body. Thus the filaments shown in Figs. 1 to 15 inclusive, are drawn substantially to scale, but greatly magnified.

The size and configuration of the fin 21 is such that the covering does not substantially indent the body portion and preferably the covering does not engage continuously the surface of the body but makes only partial contact between adjacent fins, so that an air space 26 is left between the covering 23 and body 20 as shown in Figs. 16, 17, 19 and 20, these air spaces increasing the insulating properties of the thread.

Figure 13:
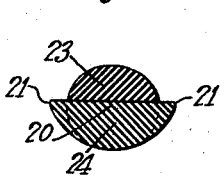
Figure 14:
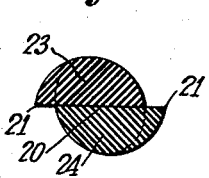
Figure 15:
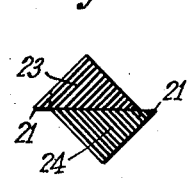

The filaments may be formed by extruding or casting latex, rubber or rubber-containing fluids, or by collecting latex or the like upon a suitable heated member, or by any combination of these or other suitable processes. For example, all of the filaments shown in Figs. 1 to 12 inclusive, may be made by extrusion through a suitable orifice, using a rubber composition which has been thickened by suitable agents such as sodium silicate so that the extruded mass retains the cross-section of the orifice until coagulation occurs. The thread of the invention may be formed by uniting two or more filaments by vulcanizing or by an adhesive. For example, two filaments 23 and 24 are united, as by vulcanizing, in such a manner as to provide fins 21 in the composite filament so produced, as illustrated in Figs. 13, 14 and 15.

The rubber filament may be formed from any suitable rubber composition whether in the form of natural or artificial dispersions of rubber or solutions or plastic compositions of natural or synthetic rubbers or suitable mixtures of the same. The rubber composition may contain fillers, vulcanizing accelerators, activators and heat-sensitizers. It is preferred to employ latex in the manufacture of the rubber filament of the invention.

The rubber filaments of the invention may be covered longitudinally with one or more yarns, threads, tapes, etc., formed of any suitable vegetable, animal or mineral fibres such as cotton, silk, rayon, wool, rubber, asbestos, etc., and such covering may be spirally wound about the rubber filament or braided thereon. During the covering process, the winding tension of the covering material should be such as to compress the projecting fins on the rubber filament without substantially indenting the body of the filament.

Figure 16:
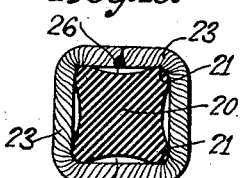
Figs. 16 and 17 are enlarged views to illustrate in cross-section a covered thread of the invention having as a core the rubber filaments of Figs. 6 and 9 respectively.
Figure 17:
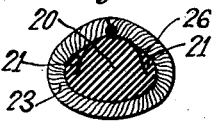

There are shown in Figs. 16 and 17 covered threads comprising the rubber filaments 20 illustrated in Figs. 6 and 9 respectively, wound helically with a single textile yarn 23.

In the thread shown in Fig. 18, the elastic rubber core comprises a filament of the type illustrated in Fig. 1, which is covered with a single textile yarn 23 wound spirally thereon in one direction and a pair of textile threads 24 wound thereon in the opposite direction.

The behavoir of the projecting fins during covering depends chiefly on the shape and position of the fin with respect to the body of the filament. When the fin projects substantially radially from the body and it is substantially symmetrical in shape, as illustrated by the embodiments shown in Figs. 1, 2, 4, 5, 6, 8 and 11, compression of the fin by the covering material will be effected on a line substantially through the longitudinal median of the fin. This compressive action is illustrated in Figs. 16 and 18 wherein the rubber filament comprises a body portion 20 having one or more substantially symmetrical fins 21 projecting radially from the body portion. The textile covering 23 which is wound about the filament compresses the fin 21 in a direction substantially through its longitudinal median without substantially indenting the surface of the body portion of the filament and without appreciably bending the fin over on the body surface. The covering 23 may, however, snugly engage the surface of the body portion between the fins. It may thus be seen that the compressed fins function as coil springs on the surface of the body portion of the filament and tend to maintain the covering material in a taut condition.

Figure 19:
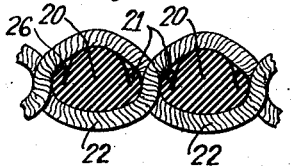
Figs. 19 and 20 illustrate, in enlarged cross-sectional views, two embodiments of the fabric of the invention containing the rubber filament shown in Figs. 9 and 2 respectively.
Figure 20:
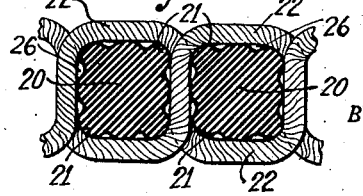

When the fin is unsymmetrical in cross-section or projects from the body portion in a non-radial or substantially tangential direction such as shown by the embodiments illustrated in Figs. 3, 7, 9, 10 and 12, the covering material bends the fins so as to cause it to lie substantially on or adjacent to the surface of the body portion. This result is illustrated in Figs. 17 and 19 wherein the fins 21 are bent over to lie against the body portion of the filament by the covering material 3 and 22 respectively. The bent-over fins in this embodiment function as leaf springs and thus tend to maintain the covering material in a taut condition.

The embodiments of the rubber filament shown in Figs. 13, 14 and 15 yield a combined action on compression by a covering material, i. e., the fins 21 will be slightly bent-over and also compressed radially. The function of the fin in any case is the same with respect to the spring action set up against the covering material.

Figure 2:
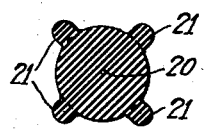
Figure 3:
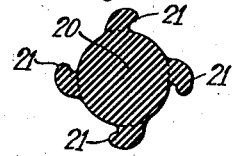
Figure 4:
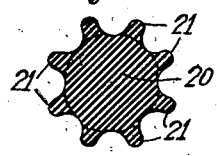

The herein disclosed rubber filament may be used directly and without covering in the formation of fabrics as by weaving, knitting, braiding or in the formation of weftless or laminated fabrics. When the filament is employed without a covering and the textile threads are associated therewith under sufficient tension the projecting fins will aid in maintaining the original relationship of rubber to textile threads and keep the formed structure in its original form or shape. The irregular reflection of light from the surface of the rubber filaments will produce a pleasing decorative effect. For example, in Figs. 19 and 20 there is shown a fabric in which the warp threads comprise uncovered rubber filaments 20 which has a cross-section before use as shown in Figs. 9 and 2 respectively, and in which the weft comprises textile threads 22, woven tightly therewith so as to compress the fins 21 on the rubber filaments. The compressed fins exert pressure against the warp threads 22 and maintain the warp threads in their original spacing and relation.

The fin or fins of a rubber filament are made sufficiently yieldable so as to be deformed by a covering yarn, or by an additional yarn which is used in making a fabric, under the normal tension which is used for applying said covering yarn or said additional yarn. In order to define this in the claims, it may be stated that the fin is sufficiently yieldable in order to enable it to be deformed by the application of an auxiliary yarn under normal tension.

From the foregoing description, the advantages of the novel filament are quite clear. The anchorage afforded by the fins diminishes the creeping of the covering material or yarn when the thread or fabric is stretched. The winding tension employed may be greatly reduced as the tension required is only that needed to compress or indent the fins which results in an elastic thread having great flexibility and elasticity.

Moreover, the irregular cross-section of the core results in the production of a larger covered thread than would be produced by the use of a round core containing the same volume of rubber. In other words, the present core gives a greater length of thread per pound of rubber and hence a lighter fabric for equal thickness of thread in identical weaves. Also, the air spaces provided between the core body and the covering increase the insulating capacity of the covered thread.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent is:

1. As an article of manufacture, a rubber filament having a body portion and a compressible longitudinal fin, said fin being sufficiently yieldable to be deformed under the application of auxiliary yarn under normal tension and forming an acute angle with the body portion.

2. As an article of manufacture, a rubber filament comprising a relatively large body portion and a relatively small compressible fin running longitudinally of the body portion, and forming an acute angle therewith.

3. As an article of manufacture, a rubber filament comprising a body portion and a plurality of compressible fins running longitudinally of the body portion and being substantially coextensive therewith, said fins being sufficiently yieldable to cause them to be deformed by the application of auxiliary yarn under normal tension and each of said fins forming an acute angle with the body portion.

4. As an article of manufacture, a rubber filament comprising a body portion and a projecting fin running longitudinally of the body portion and extending at an acute angle therefrom, said fin being adapted to be flattened against the body portion under compression, said fin being sufficiently yieldable to cause the same to be flattened by the application of auxiliary yarn under normal tension.

5. A covered elastic thread comprising an elastic rubber core-filament having an irregular and non-polygonal body cross-section so that certain spaced longitudinal surface elements of its body extend to a greater distance from the longitudinal axis of the filament than the intermediate surface elements of the body, said core-filament having covering yarn, said covering yarn maintaining said longitudinal surface elements deformed from their normal shape.

6. A covered elastic thread comprising an elastic rubber core-filament having a body portion and a compressible fin running longitudinally of the body portion, the ratio of the height of the fin to the mean diameter of the body portion lying between 1:2 and 1:5, said core-filament having covering yarn, said covering yarn maintaining said fin compressed and deformed from its normal shape.

7. As an article of manufacture, a core for covered elastic thread, comprising an elastic rubber filament having a relatively large body portion and a relatively small longitudinal fin projecting substantially tangentially from the body portion and sufficiently yieldable to be flattened against the body by a covering applied on said core under normal tension.

8. As an article of manufacture, a covered elastic thread comprising an elastic rubber filament having a compressed longitudinal fin and a covering of a textile material thereabout and maintaining said fin compressed and deformed from its normal shape.

9. As an article of manufacture, a composite elastic thread having a rubber core and an outer covering of yarn, said rubber core comprising a body portion and at least one fin extending outwardly from said body portion, the yarn being applied thereon under such tension that it is embedded in said fin, said yarn maintaining said fin deformed from its normal shape, and air spaces between the yarn and the body of said core.

10. As an article of manufacture, a covered elastic thread comprising a rubber filament having a compressed longitudinal fin deformed from its normal shape, and an extensible covering of a textile material applied thereover under sufficient tension to maintain said fin deformed and compressed and to diminish relative displacement of filament and covering when said thread is stretched.

11. As an article of manufacture, a covered elastic thread comprising a rubber filament having a compressed longitudinal fin which extends tangentially from the body of said filament when said fin has its normal shape, and a covering of a textile material over said filament and applied under sufficient tension to maintain said fin deformed and against the body portion.

12. As an article of manufacture, a covered elastic thread comprising an elastic rubber filament having a body portion and a compressible fin extending longitudinally of and substantially coextensive with said body portion, and a covering of a textile material thereover, the individual yarn-elements of the covering crossing the fin at an angle and maintaining the fin compressed at the points of crossing.

13. As an article of manufacture, a composite rubber thread comprising an elastic rubber core having an irregular and non-polygonal body cross-section so that certain spaced longitudinal surface elements of said core are at a greater distance from the longitudinal axis of said core than the intermediate surface elements of said core, said core having an extensible textile covering compressing the first-mentioned surface elements and being spaced from the intermediate surface elements of said core, said core and said covering engaging each other so as to prevent any substantial creeping when the thread is stretched.

14. A process of producing covered elastic threads which comprises covering an elastic rubber filament having a compressible longitudinal fin on its surface by winding a textile material about the filament under sufficient tension to compress the fin without substantially compressing the body portion of the filament and maintaining the fin in such compressed condition.

15. As an article of manufacture, a rubber filament, for use in textiles, comprising a body portion and a longitudinally-extending fin projecting from said body portion a sufficient distance to be pressed back against the body portion.

WILLIAM M. SPENCER.